US011189220B1

(12) United States Patent
Zheng et al.

(10) Patent No.: US 11,189,220 B1
(45) Date of Patent: Nov. 30, 2021

(54) DISPLAY DEVICE WITH DISTRIBUTED DRIVER CIRCUITS SWITCHABLE BETWEEN SERIAL AND PARALLEL COMMUNICATION MODES

(71) Applicant: Huayuan Semiconductor (Shenzhen) Limited Company, Shenzhen (CN)

(72) Inventors: Junjie Zheng, Cupertino, CA (US); Richard Landry Gray, New Taipei (TW); Chih-Chang Wei, Taoyuan (TW); Li-lun Chi, Taipei (TW)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 0 days.

(21) Appl. No.: 17/198,188

(22) Filed: Mar. 10, 2021

(51) Int. Cl.
*G06F 3/01* (2006.01)
*G09G 3/32* (2016.01)
*G09G 3/34* (2006.01)

(52) U.S. Cl.
CPC ............. *G09G 3/32* (2013.01); *G09G 3/3426* (2013.01); *G09G 2370/045* (2013.01)

(58) Field of Classification Search
CPC ........... G09G 2330/00; G09G 2370/04; G09G 2320/0646; G09G 2310/08; G09G 2300/0426; G09G 5/10; G09G 3/32; G09G 3/20; G09G 2370/045; G09G 3/3426
See application file for complete search history.

(56) References Cited

U.S. PATENT DOCUMENTS

2008/0204381 A1* 8/2008 Tsuchida .............. G09G 3/3208 345/82
2020/0082751 A1* 3/2020 Wu ........................ G09G 3/006

* cited by examiner

*Primary Examiner* — Abbas I Abdulselam
(74) *Attorney, Agent, or Firm* — Fenwick & West LLP

(57) ABSTRACT

A display device includes a control circuit, an array of LED zones, and an array of driver circuits that are distributed in the display area. The driver circuits are arranged in groups that are connected in a serial chain by a set of communication lines. The group of driver circuits are configurable between a serial communication mode and a parallel communication mode. In the serial communication mode, each driver circuit receives an incoming signal on an input pin, processes the signal through serial communication logic to generate an outgoing signal, and outputs the outgoing signal to an output pin such that the driver circuits serially process the incoming signal. In the parallel communication mode, each driver circuit transfers the incoming signal from the input pin to the output pin bypassing the serial communication logic such that all driver circuits in the group can process the incoming signal in parallel.

22 Claims, 11 Drawing Sheets

DISPLAY DEVICE WITH DISTRIBUTED DRIVER CIRCUITS SWITCHABLE BETWEEN SERIAL AND PARALLEL COMMUNICATION MODES

BACKGROUND

This disclosure relates generally to light emitting diodes (LEDs) and LED driver circuitry for a display, and more specifically to a display architecture with distributed driver circuits.

LEDs are used in many electronic display devices, such as televisions, computer monitors, laptop computers, tablets, smartphones, projection systems, and head-mounted devices. Modern displays may include well over ten million individual LEDs that may be arranged in rows and columns in a display area. In order to drive each LED, current methods employ driver circuitry that requires significant amounts of external chip area that impacts the size of the display device.

SUMMARY

In a first aspect, a display device includes an array of light emitting diode zones, a control circuit, a group of driver circuits, and a set of communication lines. The array of lighting emitting diode zones each comprise one or more light emitting diodes that generate light in response to respective driver currents. The control circuit generates driver control signals and readback command signals. The group of driver circuits are distributed in a display area of the display device and each drive a respective light emitting diode zone by controlling the respective driver currents in response to the driver control signals. The driver circuits also generate readback data to the control circuit responsive to the readback command signals. The set of communication lines couple the group of driver circuits to each other and to the control circuit in a serial chain. The group of driver circuits are switchable between a serial communication mode and a parallel communication mode. In the serial communication mode, the group of driver circuits serially process communication signals received on the set of communication lines and propagate the communication signals serially through the serial chain. In the parallel communication mode, the group of driver circuits directly propagate the communication signals between driver circuits via the set of communication lines to enable parallel processing of the communication signals.

In another aspect, a driver circuit includes mode control logic, parallel communication control logic, an LED driver, serial communication logic, and a multiplexer. The mode control logic configures the communication mode of the driver circuit between a parallel communication mode and a serial communication mode. The parallel communication logic receives a driver input signal and generates an LED control signal based on the driver input signal received on a data input pin. The LED driver drives an LED zone in response to the LED control signal. The serial communication logic receives the driver input signal and outputs an outgoing serial communication signal. The multiplexer selects between outputting the driver input signal to a data output pin when the driver circuit is configured in a parallel communication mode and outputting the outgoing serial communication signal to the data output pin when the driver circuit is configured in a serial communication mode.

In another aspect, a method is provided for operating a display device including a group of driver circuits coupled to each other and to a control circuit in a serial chain via a set of communication lines. A control circuit generates driver control signals and readback command signals. A group of driver circuits are configured in a serial communication mode and facilitate assignment of addresses using addressing signals that propagate serially through the serial chain via the set of communication lines. Each of the group of driver circuits serially processes the addressing signal using serial communication logic. Following the assignment of addresses, the group of driver circuits are configured in a parallel communication mode in which the serial communication logic is bypassed. The driver control signals are sent to the group of driver circuits in the parallel communication mode via the communication lines to enable the group of driver circuits to process the driver control signals in parallel. The group of driver circuits drives the respective light emitting diode zones by controlling respective driver currents in response to the driver control signals.

BRIEF DESCRIPTION OF THE DRAWINGS

The teachings of the embodiments of the present invention can be readily understood by considering the following detailed description in conjunction with the accompanying drawings.

Figure (FIG.) 1 is a circuit diagram of a first embodiment of a display device including distributed driver circuits.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive aspect matter.

DETAILED DESCRIPTION OF EMBODIMENTS

A display device includes a control circuit, an array of LED zones, and an array of driver circuits that are distributed in the display area. The driver circuits are arranged in groups that are connected in a serial chain by a set of communication lines. The group of driver circuits are configurable between a serial communication mode and a parallel communication mode. In the serial communication mode, each driver circuit receives an incoming signal on an input pin, processes the signal through serial communication logic to generate an outgoing signal, and outputs the outgoing signal to an output pin such that the driver circuits serially process the incoming signal. In the parallel communication mode, each driver circuit transfers the incoming signal from the input pin to the output pin bypassing the serial communication logic such that all driver circuits in the group can process the incoming signal in parallel.

Figure 1:
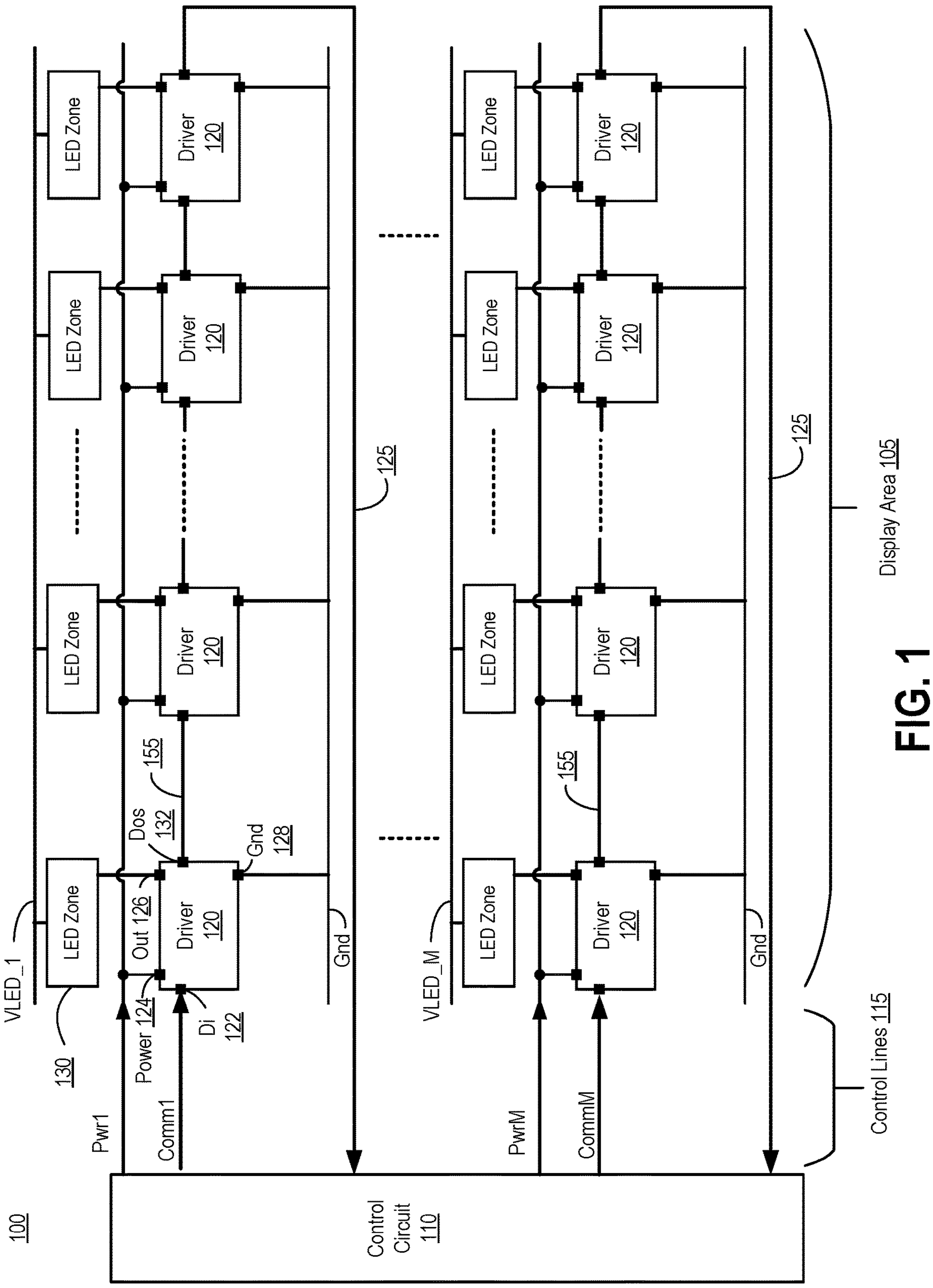

Figure (FIG. 1 is a circuit diagram of a display device 100 for displaying images or video. In various embodiments, the display device 100 may be implemented in any suitable form-factor, including a display screen for a computer display panel, a television, a mobile device, a billboard, etc. The display device 100 may include a display area 105, a control circuit 110, and a set of control lines 115. The display area 105 comprises an array of LED zones 130 and distributed driver circuits 120 that drive the LED zone 130. The display area 105 comprises an array of pixels for displaying images based on data received from the control circuit 110. The display area 105 may include LED zones 130, a set of distributed driver circuits 120, power supply lines including VLED lines (e.g., VLED_1, . . . VLED_M), driver supply lines, Pwr, and ground (GND) lines, and various signaling lines including communication lines 155 that couple the driver circuits 120 to each other and to the control circuit 110, and an optional readback line 125.

Figure 4A:
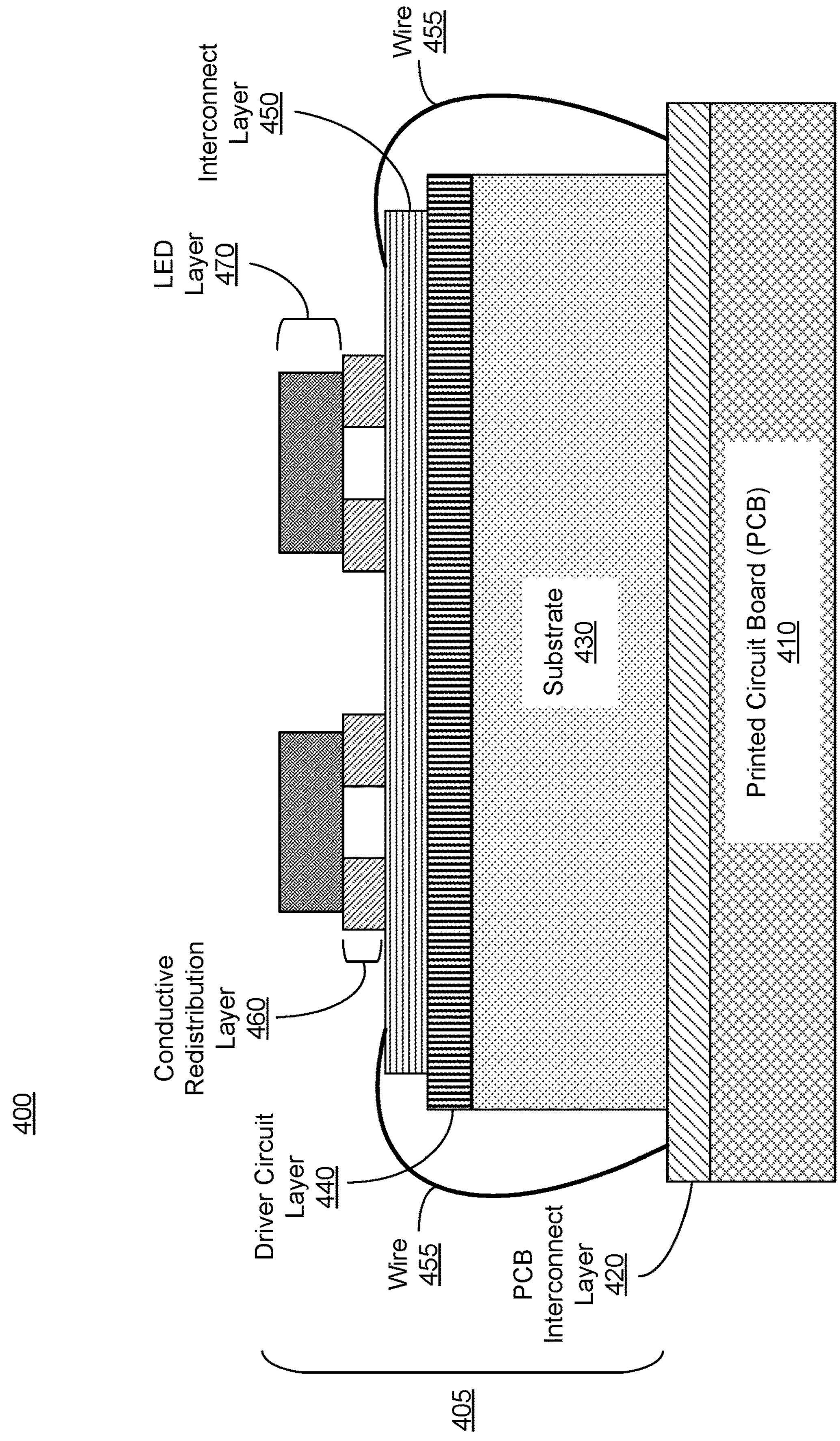
FIG. 4A is a cross sectional view of a first embodiment of an LED and driver circuit that may be utilized in a display device.
Figure 4B:
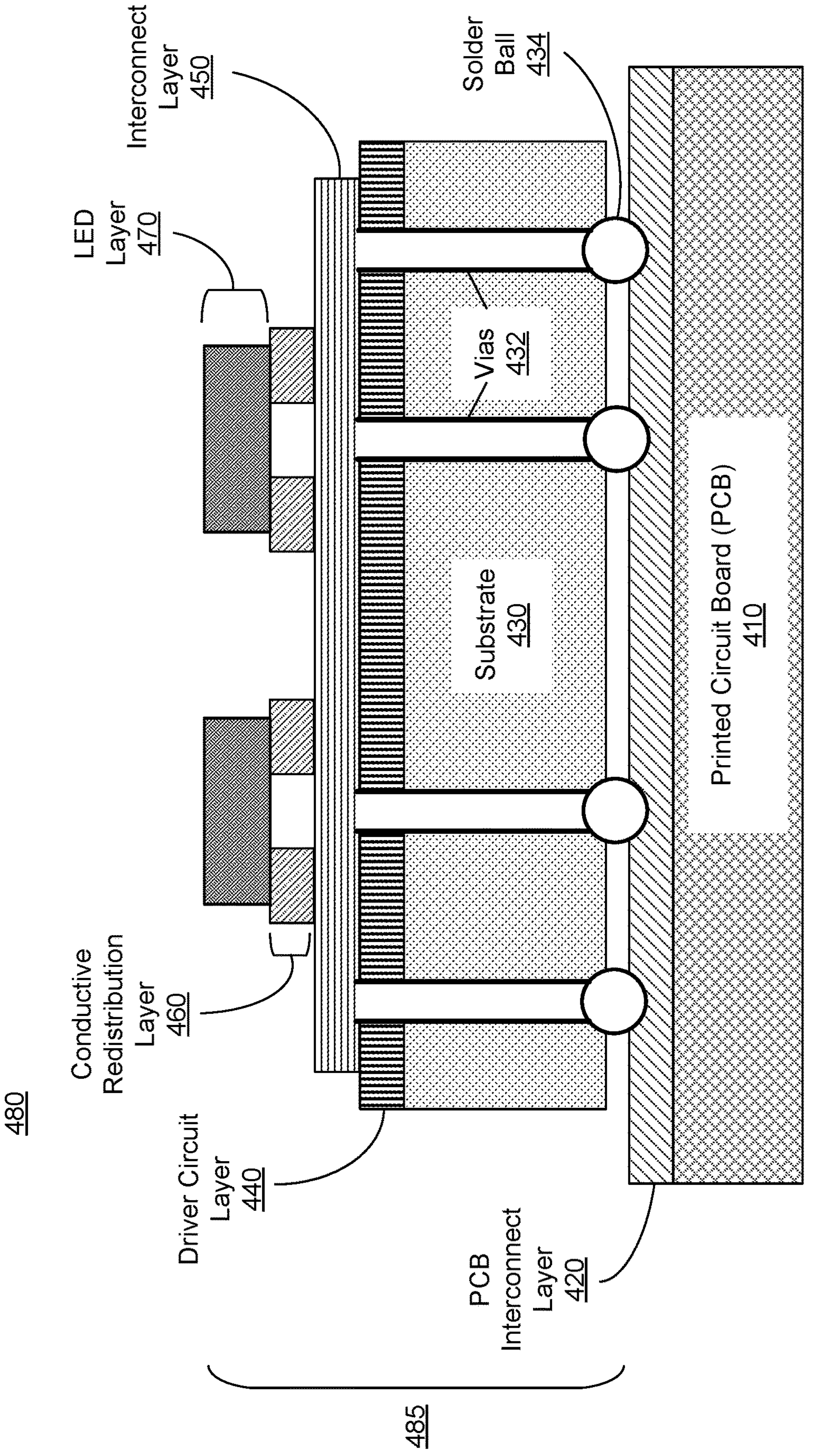
FIG. 4B is a cross sectional view of a second embodiment of an LED and driver circuit that may be utilized in a display device.
Figure 4C:
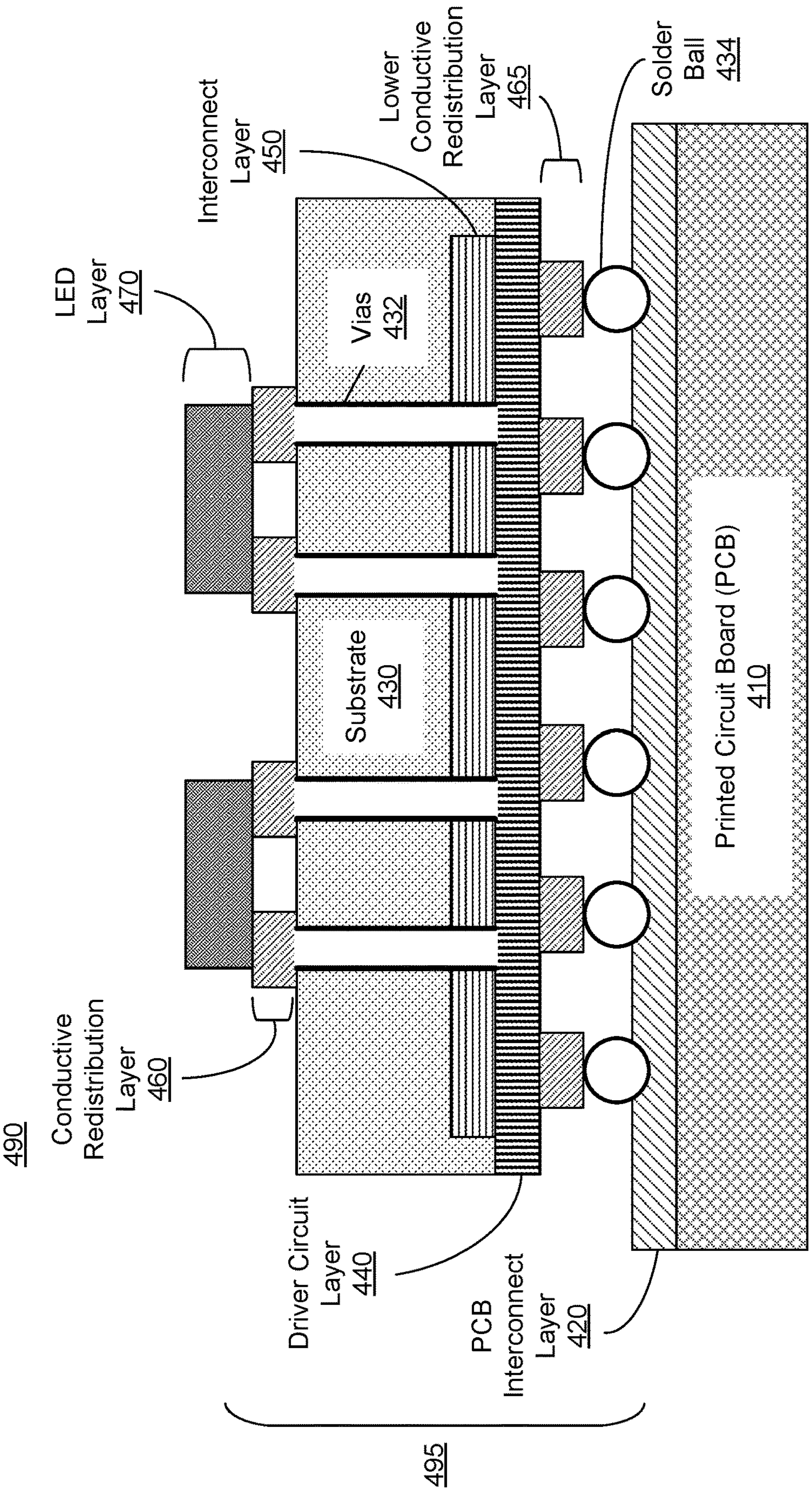
FIG. 4C is a cross sectional view of a third embodiment of an LED and driver circuit that may be utilized in a display device.
Figure 5:
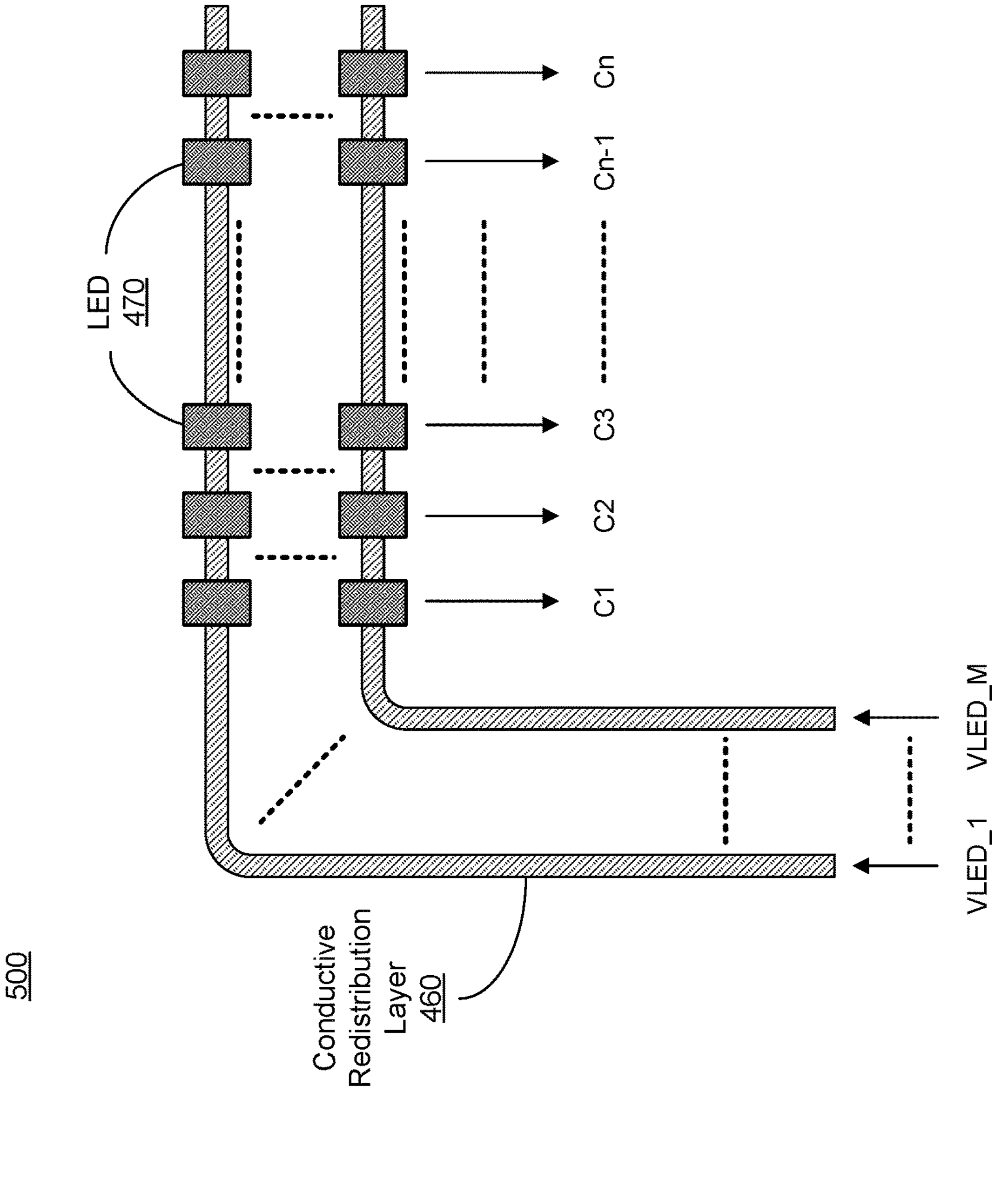
FIG. 5 is a top down view of a display device using an LED and driver circuit, according to one embodiment.
Figure 6:
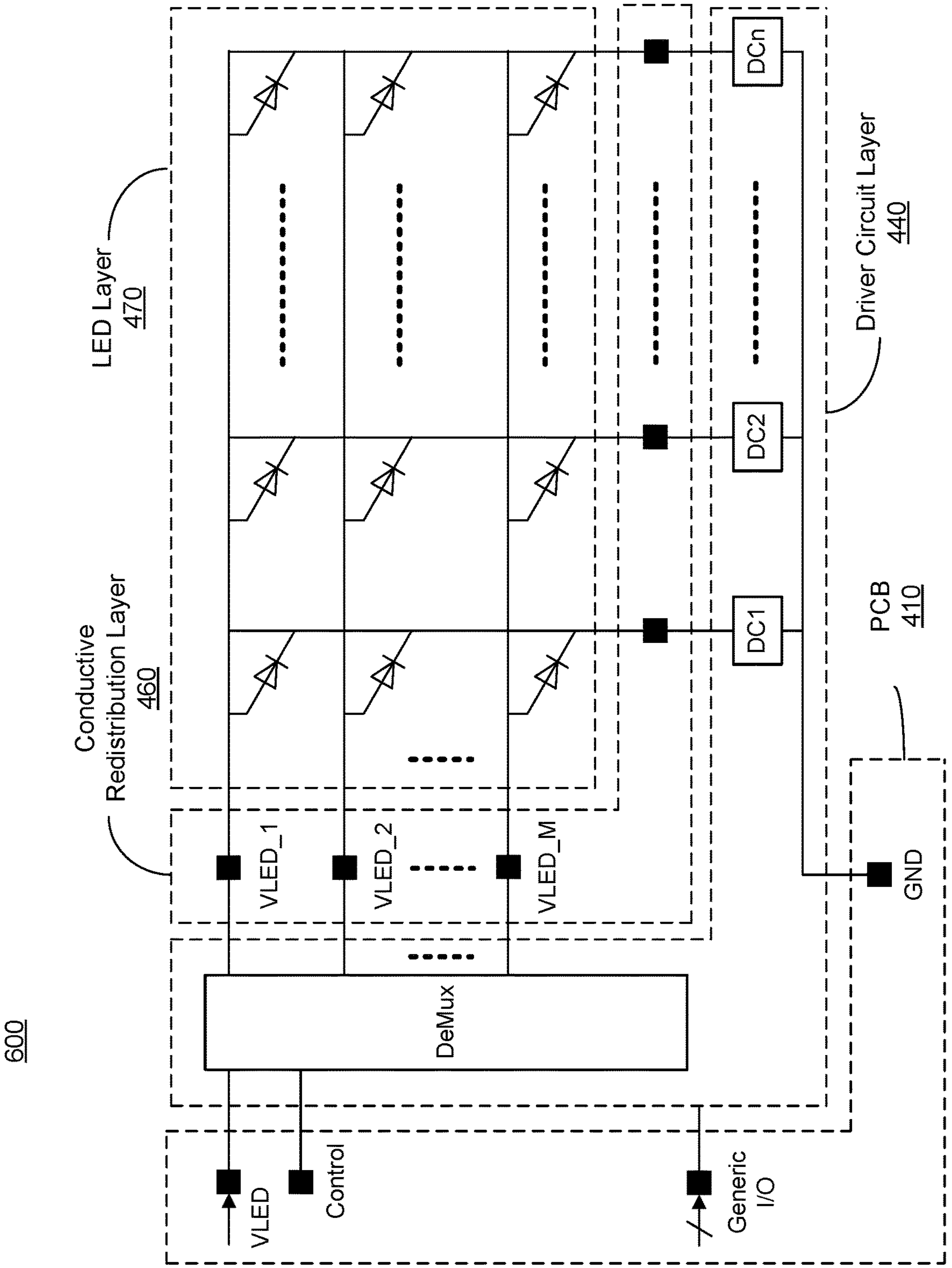
FIG. 6 illustrates a schematic view of several layers of an LED and driver circuit for a display device, according to one embodiment.

The driver circuit 120 and corresponding LED zone 130 may be embodied in an integrated package such that the LED zone 130 is stacked over the driver circuits 120 on a substrate as further described in FIGS. 4-6. Alternatively, the driver circuit 120 and corresponding LED zone 130 may be embodied in separate packages.

The display device 100 may comprise a liquid crystal display (LCD) device or an LED display device. In an LCD display device, LEDs provide white light backlighting that passes through liquid crystal color filters that control the color of individual pixels of the display. Each LED zone 130 may include LEDs corresponding to a one-dimensional or two-dimensional array of pixels. In an LED display device, LEDs are directly controlled to emit colored light corresponding to each pixel of the display device 100. Here, each LED zone 130 may comprise one or more LEDs corresponding to a single pixel or may comprise a one-dimensional array or two-dimensional array of LEDs corresponding to an array of pixels (e.g., one or more columns or rows). For example, in one embodiment, the LED zone 130 may comprise one or more groups of red, green, and blue LEDs that each correspond to a sub-pixel of a pixel. In another embodiment, the LED zone 130 may comprise one or more groups of red, green, and blue LED strings that correspond to a column or partial column of sub-pixels or a row or partial row of sub-pixels. For example, an LED zone 130 may comprise a set of red sub-pixels, a set of green sub-pixels, or a set of blue sub-pixels.

The LEDs of each LED zone 130 may be organic light emitting diodes (OLEDs), inorganic light emitting diodes (ILEDs), mini light emitting diodes (mini-LEDs) (e.g., having a size range between 100 to 300 micrometers), micro light emitting diodes (micro-LEDs) (e.g., having a size of less than 100 micrometers), white light emitting diodes (WLEDs), active-matrix OLEDs (AMOLEDs), transparent OLEDs (TOLEDs), or some other type of LEDs.

The driver circuits 120 are distributed in the display area 105 and drive corresponding LED zones 130 by controlling a drive current through the LED zones 130 based on driver control signals received from the control circuit 110. For example, the driver circuits 120 may adjust a current level and/or duty cycle of the drive current to achieve a desired brightness of the LEDs in the LED zone 130. In an embodiment, the driver circuits 120 may each control two or more color channels of an LED zone 130 (e.g., red, green, and blue color channels) via independently controllable drive currents for each channel.

In an embodiment, the driver circuits 120 may furthermore include integrated sensors. For example, the driver circuits 120 may include integrated temperature sensors, light sensors, voltage sensors, image sensors, or other sensing devices. In response to readback commands from the control circuit 110, the driver circuits 120 output requested sensor data to the control circuit 110 that may be utilized by the control circuit 110 to adjust operation of display device 100 (e.g., adjusting the driver control signals). In alternative embodiments, the display area 105 may include dedicated sensor devices (not shown) external to the driver circuits 120 that provide one or more sensing functions. The dedicated sensor device may similarly provide readback data to the control circuit 110 for adjusting operation of the display device 100.

The driver circuits 120 may be arranged in groups (e.g., rows) that share common power supply lines (including driver circuit supply lines Pwr and LED zone supply lines VLED) and control lines 115. For example, the driver circuits 120 in a group may be coupled to each other and to the control circuit 110 via a set of communication lines 155 and an optional readback line 125. The communication lines 155 may be configured for unidirectional or bidirectional communication in different embodiments. In the case of bidirectional communication lines 155, the readback line 125 may be optionally omitted.

The driver circuits 120 include control logic that may operate in various modes including at least an addressing mode, a configuration mode, and an operational mode. During the addressing mode, the control circuit 110 initiates an addressing procedure to cause assignment of addresses to each of the driver circuits 120. During the configuration and operational modes, the control circuit 110 transmits commands and data that may be targeted to specific driver circuits 120 based on their addresses. In the configuration mode, the control circuit 110 configures driver circuits 120 with one or more operating parameters (e.g., overcurrent thresholds, overvoltage thresholds, clock division ratios, and/or slew rate control). During the operational mode, the control circuit 110 provides control data to the driver circuits 120 that causes the driver circuits to control the respective driver currents to the LED zones 130, thereby controlling brightness. The control circuit 110 may also issue commands to the driver circuits 120 during the operational mode to request readback data (e.g., sensor data), and the driver circuits 120 provide the requested readback data to the control circuit 110 in response to the commands.

The driver circuit 120 may include a power pin 124, a ground pin (Gnd) 128, one or more LED driving output pins (Out) 126, a data input pin (Di) 122, and a data output pin 132.

The ground pin 128 is configured to provide a path to a ground line for the driver circuit 120, which may be common to the corresponding LED zone 130. The power pin 124 provides a connection to the driver circuit power supply line Pwr.

The data input pin 122 and data output pin 132 are coupled to the communication lines 155 to facilitate communication to and from the driver circuits 120. The communication lines 155 may be used, for example, to assign addresses to the driver circuits 120, to send dimming control signals to the driver circuits, to send readback commands to the driver circuits 120, or to provide readback data to the control circuit 110 in response to commands as described below.

Alternatively, the data input pins 122 and data output pins 132 may be assignable to different physical pins to enable bidirectional communication. Thus, for example, the driver circuits 120 may be configurable for communication in a forward direction (left to right in FIG. 1) in which the pins 122 operate as the data input pins and the pins 132 operate as the data output pins (as shown in FIG. 1), or may be configurable for communication in a reverse direction (right to left in FIG. 1) in which the pins 122 instead operate as the data output pins and the pins 132 instead operate as the data input pins.

The one or more LED driving output pins 126 is coupled to the LED zone 130 to control the driver current through the LED zones 130. In an embodiment, the one or more LED driving output pins 126 may comprise a set of multiple pins to control different respective channels of the LED zone 130. For example, in an LED display device, the LED driving output 126 may include 3 pins to control red, green, and blue channels of the LED zones 130. Alternatively, in an LCD display device, the LED driving output 126 may comprise a single pin for controlling a white backlighting channel.

The communication lines 155 may be utilized for communication in either a serial communication mode or a parallel communication mode. In the serial communication mode, serial communication data (e.g., commands or sensor data) propagates between the control circuit 110 and one or more of the driver circuits 120 in a group via a sequence of serial hops over the communication lines 155 and/or the readback line 125. Here, a driver circuit 120 receives an incoming serial communication signal on its data input pin 122, processes the incoming serial communication signal to generate an outgoing serial communication signal (which may be different than the incoming serial communication signal), and outputs the outgoing serial communication signal on its data output pin 132. Thus, for example, to send a serial command from the control circuit 110 to a target driver circuit 120, the control circuit 110 sends the command to the first driver circuit 120, the first driver circuit 120 receives the serial command, processes the serial command and outputs it the next driver circuit 120, and so on until it reaches the target driver circuit 120. To send data from a driver circuit 120 to the control circuit 110, the driver circuit 120 outputs the data on its data output pin 132 to an adjacent driver circuit 120, which receives and processes the data and outputs it via its data output pin 132, until the data reaches the control circuit 110 via the readback line 125. Alternatively, if bidirectional communication is used, the configurable data input pins 122 and data output pins 132 may be swapped to enable communication in the reverse direction from a driver circuit 120 to the control circuit 110.

The driver circuits 120 may operate in the serial communication mode in conjunction with a clock signal (not shown) or using a clockless protocol. If the clock signal is present, the signals may propagate between driver circuits 120 synchronously (e.g., one bit of data per clock cycle). Otherwise, if a clockless architecture is used, data may encoded using an encoded scheme (such as bi-phase mark encoding) that enables the data to be asynchronously shifted through the serial communication chain.

In the parallel communication mode, the driver circuits 120 are configured to create direct connections (with optional buffering) between the data input pins 122 and data output pins 132 to enable the communication lines 155 to collectively operate as a parallel communication bus between the control circuit 110 and each of the driver circuits 120. For example, in the parallel communication mode, each of the driver circuits 120 in the group receives the data approximately in parallel (e.g., with only limited propagation delay that can be significantly less than the processing time in the serial communication mode). Here, each driver circuit 120 may optionally buffer the data but otherwise does not change the data or wait for completion of processing the data before passing it to the next driver circuit 120. Thus, to send a parallel command from the control circuit 110 to a target driver circuit 120, the control circuit 110 outputs the command to the first driver circuit 120, the first driver circuit 120 directly passes (with operational buffering) the command to the next driver circuit, and so on such that all driver circuits 120 in the group receive the command approximately in parallel. After the control circuit issues a readback request command, the driver circuits 120 may send the readback data serially from one driver circuit to the next then finally to the readback line 12 and ultimately back to the control circuit.

In an embodiment, the driver circuits 120 are configured for serial communication during the addressing mode to serially propagate address information for facilitating assignment of addresses. Here, an addressing signal is sent from the control circuit 110 via the communication lines 155 to the first driver circuit 120 in a group of driver circuits 120. The first driver circuit 120 receives the address signal via its data input pin 122, stores an address based on the incoming addressing signal and generates an outgoing addressing signal for outputting to the next driver circuit 120 via its data output pin 132 and the communication line 155. The second driver circuit 120 similarly receives the addressing signal from the first driver circuit 120 via its data input pin 122, stores an address based on the incoming addressing signal, and outputs an outgoing addressing signal to the next driver circuit 120 via its data output pin 132. This process continues through the chain of driver circuits 120. The last driver circuit 120 may optionally send its assigned address back to the control circuit 110 to enable the control circuit 110 to confirm that addresses have been properly assigned. The addressing process may be performed in parallel or sequentially for each group (e.g., each row) of driver circuits 120.

In an example addressing scheme, each driver circuit 120 may receive an address, store the address, increment the address by 1 or by another fixed amount, and send the incremented address as an outgoing addressing signal to the next driver circuit 120 in the group. Alternatively, each driver circuit 120 may receive the address of the prior driver circuit 120, increment the address, store the incremented address, and send the incremented address to the next driver circuit 120. In other embodiments, the driver circuit 120 may generate an address based on the incoming address signal according to a different function (e.g., decrementing).

After addressing, the driver circuits 120 may be configured in the parallel communication mode in the normal operation mode for receiving commands based on the addresses. The commands may include dimming commands to control dimming of the LED zones 130 or readback commands that request readback data from a driver circuit 120. For dimming commands, the driver circuits 120 receive the dimming data and adjust the driving currents to the corresponding LED zone 130 to achieve the desired brightness. The readback commands may request information such as channel voltage information, temperature information, light sensing information, status information, fault information, or other data. In response to these readback commands, the driver circuits 120 may be reconfigured in the serial communication mode to obtain the requested readback data and send the readback data to the control circuit 110 via serial communication. After readback is complete, the driver circuits 120 may be reconfigured in the parallel communication mode.

Readback commands may be targeted to a single driver circuit 120 (by specifying a target address) or to a group of driver circuits 120. In an example process for implementing a readback command to a targeted driver circuit 120, the driver circuits 120 are configured in the parallel communication mode, and the control circuit 110 sends a readback command which is received by all driver circuits 120 in the group. Upon recognizing the command as a readback command, the driver circuits 120 reconfigure themselves into the serial communication mode. The targeted driver circuit 110 obtains the requested readback data and outputs it on its data output pin 132. The next driver circuit 120 receives the readback data on its data input pin 122 and propagates it to the next driver circuit 120 in the serial chain until it reaches the control circuit 110. Readback data can propagate through the chain in either direction in the serial communication mode. In an embodiment, responses to readback commands may include the address of the targeted driver circuit 120 to enable the control circuit 110 to confirm which driver circuit 120 provided the response.

In an example of a group readback command, the control circuit 110 sends a readback command which is received by all driver circuits 120 in the group. Upon recognizing the command as a readback command, the driver circuits 120 reconfigure themselves into the serial communication mode. Beginning with a predefined starting driver circuit 120 (e.g., the first driver circuit 120 in the chain) relevant readback data may be obtained, processed, and sent to the next driver circuit 120. As the readback data propagates through the chain, each driver circuit 120 combines the data received from the prior driver circuit 120 with its sensed data to provide a single result to the control circuit 110. For example, in one embodiment, the control circuit 110 may issue a channel sensing command through the communication line 155. The first driver circuit 120 receives the channel voltage sensing command and outputs the command together with its sensed channel voltage to the next driver circuit 120. The next driver circuit 120 receives the command and the incoming channel voltage value from the previous driver circuit 120, senses its own channel voltage, and applies a function to the incoming channel voltage value and the sensed channel voltage to generate an outgoing channel voltage value that it outputs via the communication line 155. Here, the function may comprise a minimum function such that the driver circuit 120 compares the received channel voltage with its sensed channel voltage, and outputs via the communication line 155, the lower of the received channel voltage from the prior driver circuit 120 and the sensed channel voltage from the current driver circuit 120. Alternatively, the function may comprise, for example, a maximum function, an average function, or other function. This process repeats throughout the chain of driver circuits 120 so that each driver circuit 120 outputs a resulting value (e.g., a min, max, or average value) based on the sensed channel voltages detected among the current driver circuits 120 and all prior driver circuits 120. The resulting readback data received by the control circuit 110 represents a function (e.g., a min, max, or average) of each of the detected channel voltages in the group of driver circuits 120. The control circuit 110 can then set a shared supply voltage VLED for the LED zones 130 in each group or another control parameter according to the readback data. For example, by applying a minimum function to obtain the lowest channel voltage in the group, the control circuit 110 can set the supply voltage VLED for the LED zones 130 to a level sufficient to drive the LED zone 130 with the lowest sensed channel voltage to a predetermined level.

In another example, a group command may be utilized for temperature sensing. During readback, a driver circuit 120 receives a temperature from an adjacent driver circuit 120, applies a function to the received temperature and its own sensed temperature to generate an outgoing temperature value, and outputs the outgoing temperature to the next driver circuit 120. Thus, the control circuit 110 can obtain a function of the sensed temperatures associated with each of the driver circuits 120 in the group. Here, the function may comprise, for example, summing or averaging, or detecting a minimum or maximum value. The control circuit 110 can then adjust the operation of the driver circuits 110 to account for temperature-dependent variations in the outputs of the LED zones 130.

In another example, a group command may be utilized for fault detection. Here, each driver circuit 120 may propagate a fault status flag through the chain, with each driver circuit 120 having the ability to set the fault status flag if a fault. The fault status flag (together with an address of the faulty driver circuit 120) may then be propagated to the control circuit 110 to enable the control circuit 110 to detect the faulty driver circuit 120 and adjust operation of the driver circuits 120 accordingly.

The readback data can be utilized to calibrate a display device 100. For example, the control circuit 110 can change both the LED current and the on/off duty cycle of the driver circuits 120 in order to change the effective brightness of each LED zone 130 based on received feedback from the driver circuits 120. More specifically, the control circuit 110 may calibrate the driver circuits 120 so that LED zones 130 each output the same brightness in response to the same brightness control signal, despite process variations in the LEDs or associated circuitry that may otherwise cause variations. The calibration process may be performed by measuring light output, channel voltages, temperature, or other data that may affect performances of the LEDs using sensors in the display area 105. Alternatively, the measurements may be made by equipment outside of the display area 105, such as a separate high accuracy light meter used specifically for a calibration sequence. The calibration process may be repeated over time (e.g., as the display device 100 heats up during operation).

In other embodiments, a group of driver circuits 120 do not necessarily correspond to a row of the display area 105. In alternative embodiments, a group of connected driver circuits 120 coupled via communication lines 155 may instead correspond to a partial row of the display area 105 or a full or partial column of the display area 105. In another embodiment, a group of driver circuits 120 may correspond to a block of adjacent or non-adjacent driver circuits 120 that may span multiple rows and columns.

In different configurations, one or more dedicated sensor circuits (not shown) may be coupled in a group of driver circuits 120. Here, the sensor circuits may have similar pin configurations and connectivity as the driver circuits 120 except they are not coupled to drive an LED zone 130. The sensor circuits may similarly facilitate addressing and readback through the communication chain and may similarly respond to readback commands with sensed readback data.

Figure 2A:
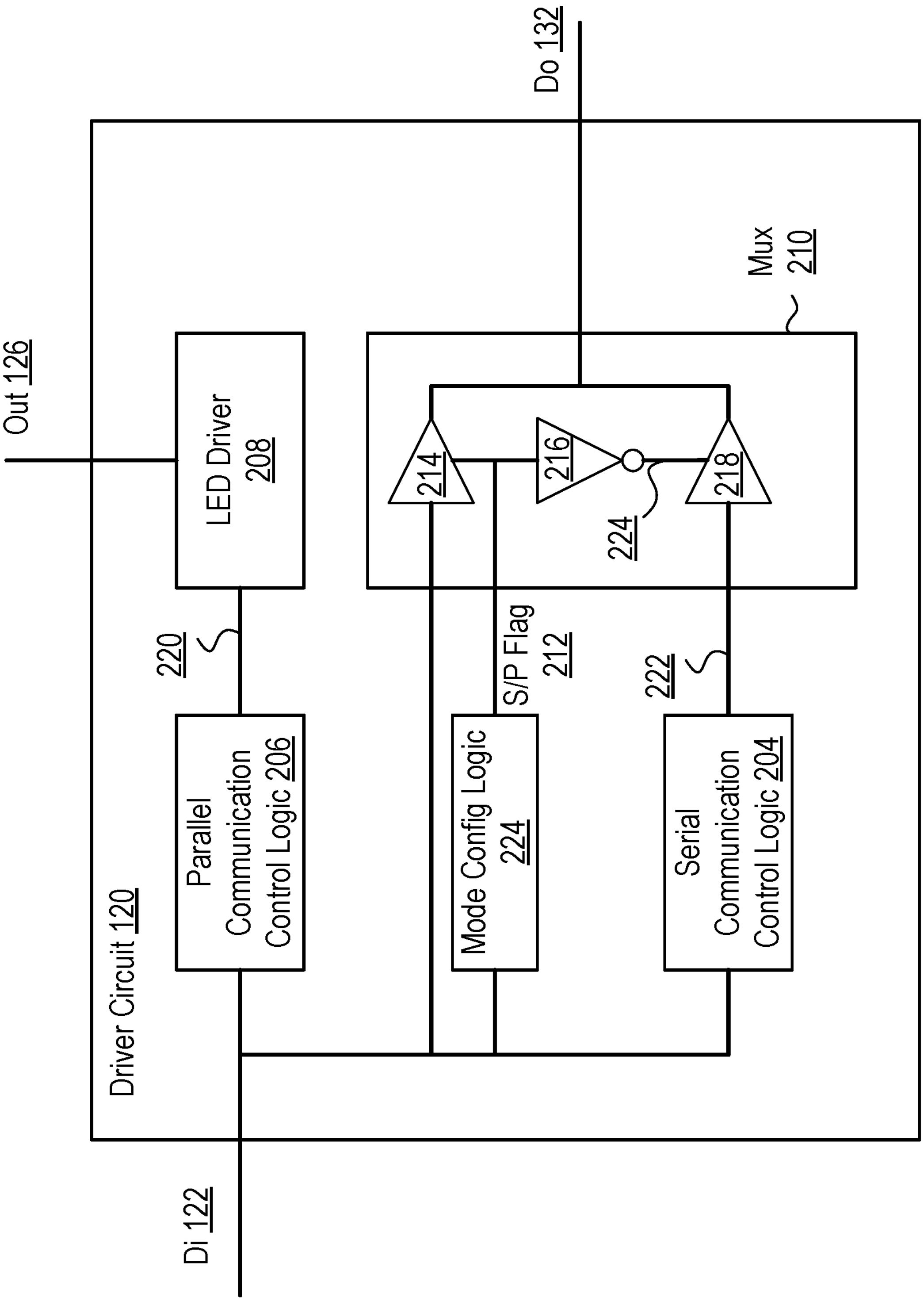
FIG. 2A is a circuit diagram of an embodiment of a driver circuit.

FIG. 2A illustrates an example embodiment of a driver circuit 120. The driver circuit includes parallel communication control logic 206, serial communication control logic 204, an LED driver 208, mode configuration logic 224, and a multiplexer 210. Additional components (e.g., power regulators, fault protection logic, etc.) are omitted from the drawing for clarity of description.

The mode configuration logic 214 configures the driver circuit 110 in either the serial communication mode or the parallel communication mode. For example, in an embodiment, the mode configuration logic 224 configures the driver circuit 120 in the serial communication mode during the addressing mode and during readback operations, and otherwise configures the driver circuit 110 in the parallel communication mode for receiving commands during normal operation. The mode configuration logic 214 may switch between modes based on the data input signal received on the data input pin 122. For example, the mode configuration logic 214 may initially configure the driver circuit 120 in the serial communication mode upon power up and before addresses are assigned. Once the driver circuit 120 obtains an address, it switches to the parallel communication mode for receiving dimming and readback commands. When the mode configuration logic 214 recognizes a readback command, it switches to the serial communication mode for readback. Then, after the driver circuit 120 performs its serial communication function for readback, it switches back to the parallel communication mode.

The parallel communication control logic 206 receives a data input signal from the data input pin 122 and passes dimming commands to the LED driver 208, which controls driving of the LED zone 130 via the LED driving output pin 126. For example, the LED driving logic 208 controls current through the LED zone 130 based on the desired brightness in the dimming commands The serial communication control logic 204 also receives the data input signal from the data input pin 122. The serial communication control logic 204 processes incoming serial communication signals data to generate an outgoing serial communication signal 222. For example, in the addressing mode, the serial communication control logic 204 may receive an incoming addressing signal and generate an outgoing addressing signal as the serial output signal 222. For readback, the serial communication control logic 204 may receive incoming readback data and generate outgoing readback data as the serial output signal 222. In an embodiment, the serial communication control logic 204 may ignore commands intended for parallel communication, such as dimming commands.

The multiplexer 210 outputs a buffered data input signal when the S/P flag 212 is configured for parallel communication, and outputs a buffered serial output signal 222 when the S/P flag 212 is configured for serial communication. In an example implementation, the multiplexer 210 includes a parallel channel buffer 214, an inverter 216, and a serial channel buffer 218. When the mode configuration logic 224 sets the S/P flag 212 to the parallel mode, the parallel channel buffer 214 turns on and the serial channel buffer 218 is turned off (tri-stated) based on the inverted S/P flag 224 generated by the inverter 216. Thus, the data input signal on the data input pin 122 is buffered and directly passed to the data output pin 132. When the mode configuration logic 224 sets the S/P flag 212 to the serial mode, the parallel channel buffer 214 turns off (tri-states) and the serial channel buffer 218 turns on based on the inverted S/P flag 224 generated by the inverter. Thus, the data input pin 122 is processed by the serial communication control logic 214 to generate an outgoing serial communication 222, which is buffered and outputted to the data output pin 132.

Figure 2B:
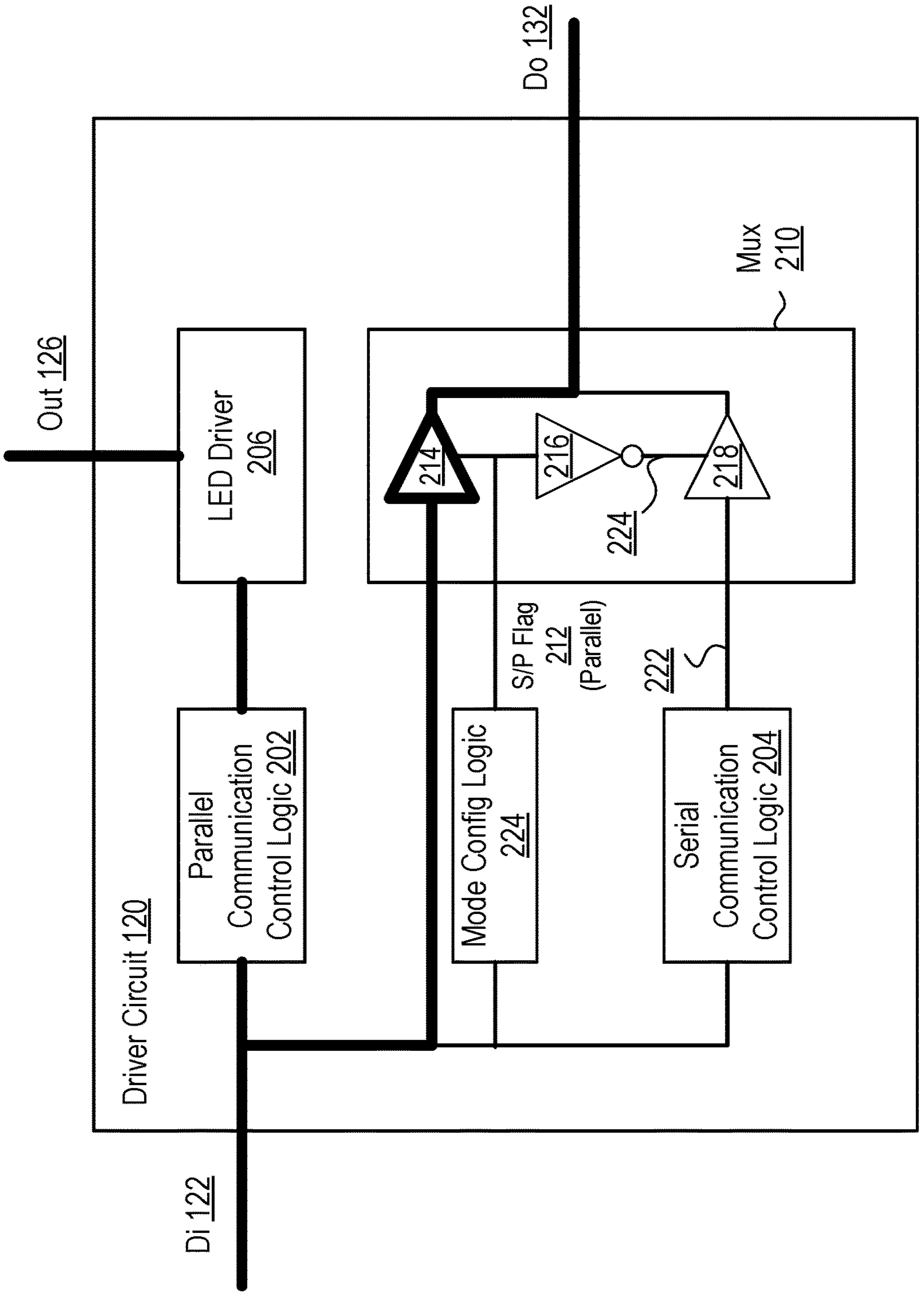
FIG. 2B is a circuit diagram of an embodiment of a driver circuit showing a signal path when operating in a parallel communication mode.

FIG. 2B illustrates an example embodiment of the signal path (shown in thick lines) when operating the driver circuit 120 in the parallel communication mode to process dimming commands in the normal operating mode. Here, the input commands are received at the data input pin 122. The mode configuration logic 212 recognizes dimming commands and provides them to the LED driving logic 206, which drives the LED zone 130 via the LED driving output pin 126 in accordance with the dimming control signal. The mode configuration logic 224 controls the S/P flag 212 to cause the multiplexer 210 to turn on the parallel channel buffer 214 and turn off (tri-states) the serial channel buffer 218 to bypass the serial communication logic and to directly output a buffered data input signal to the data output pin 132. In a clocked system, the propagation delay from the data input pin 122 to the data output pin 132 is much less than the clock cycle time, so that chained driver circuits 120 in a group can effectively receive the signals in parallel. In a system that uses clock-less communication, the delay has no effect on signal synchronization (because without a clock the system is asynchronous by definition). The propagation delays will add up from the first driver in a row to the last driver in a row. However, the aggregate gate delay caused by buffer 214 is so small compared to the frame rate of the display that it is effectively negligible.

Figure 2C:
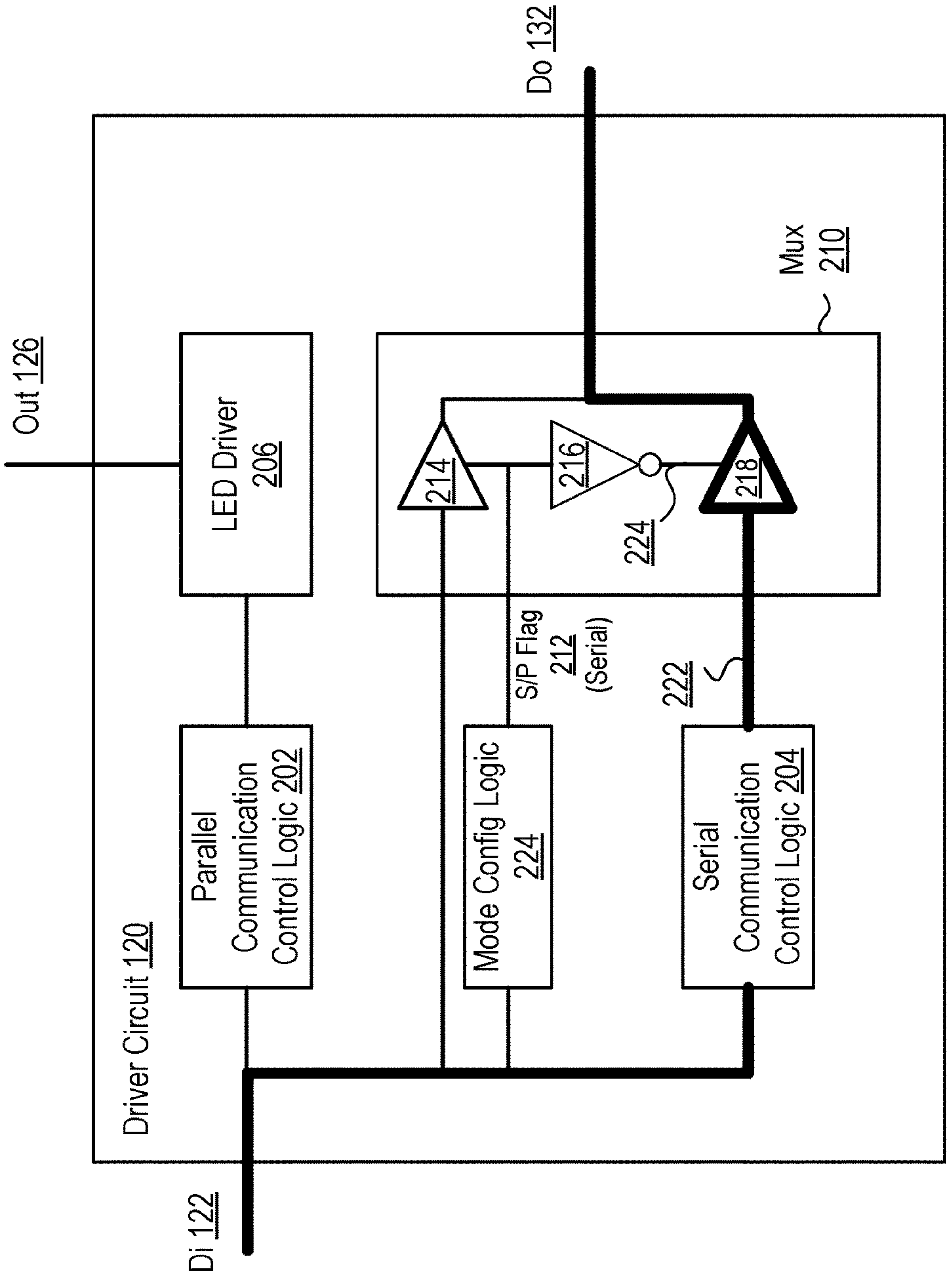
FIG. 2C is a circuit diagram of an embodiment of a driver circuit showing a signal path when operating in a serial communication mode.

FIG. 2C illustrates an example embodiment of the signal path (shown in thick lines) when operating the driver circuit 120 in the serial communication mode (e.g., to process addressing signals or to output readback data). The data input signal is received at the data input pin 122. If the mode configuration logic 224 recognizes the data input signal as either addressing signals or readback signal, the mode configuration logic 224 configures the S/P flag to cause the multiplexer 210 to turn on the serial channel buffer 218 and bypass the parallel communication line via the parallel channel buffer 214. In this mode, all signals passing from the data input pin 122 to the data output pin 132 are processed by the serial communication control logic 204, which may transform the signals in various ways according to the serial communication function.

Figure 2D:
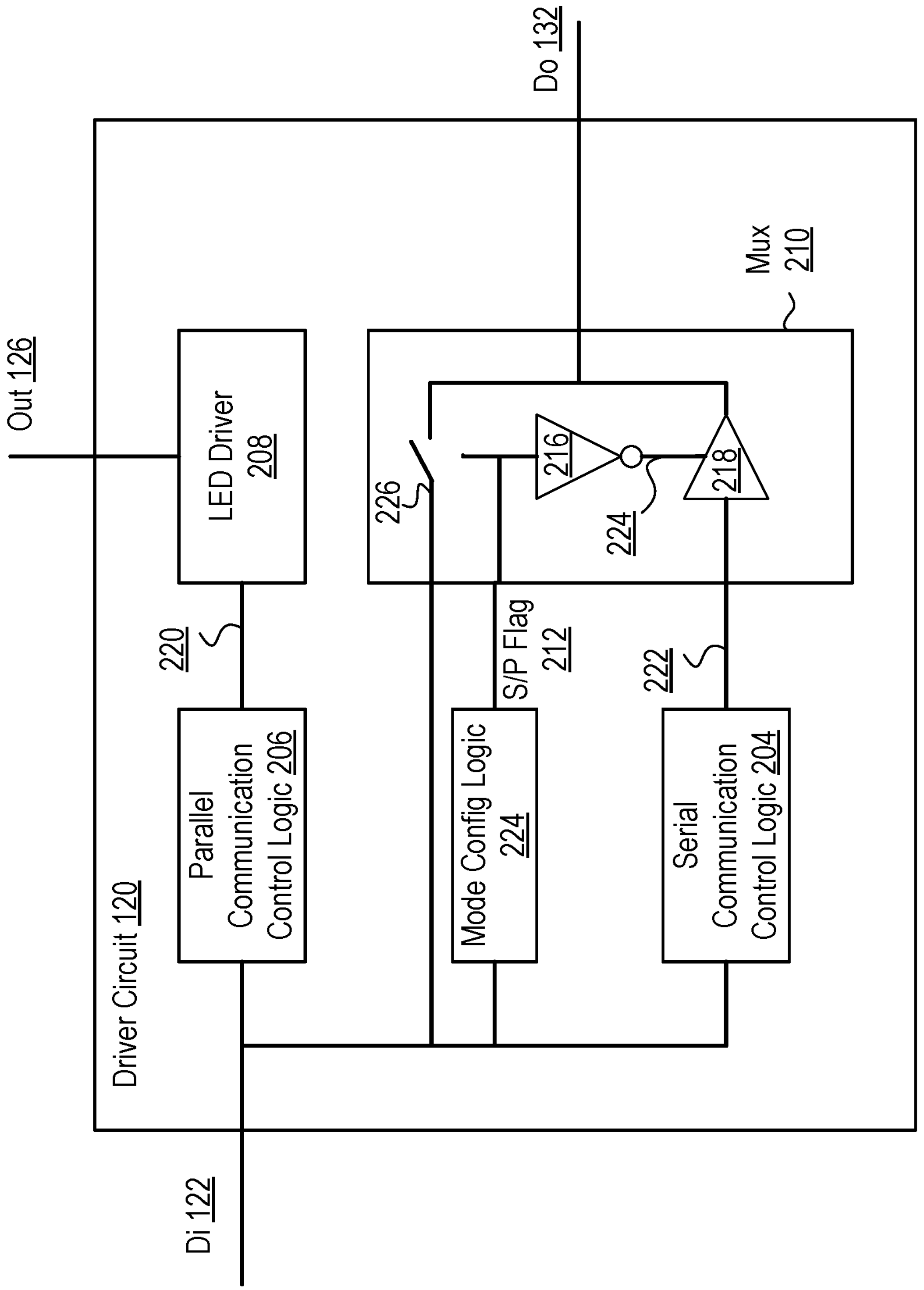
FIG. 2D is a circuit diagram of an alternative embodiment of a driver circuit that enables bidirectional parallel communication.
Figure 3:
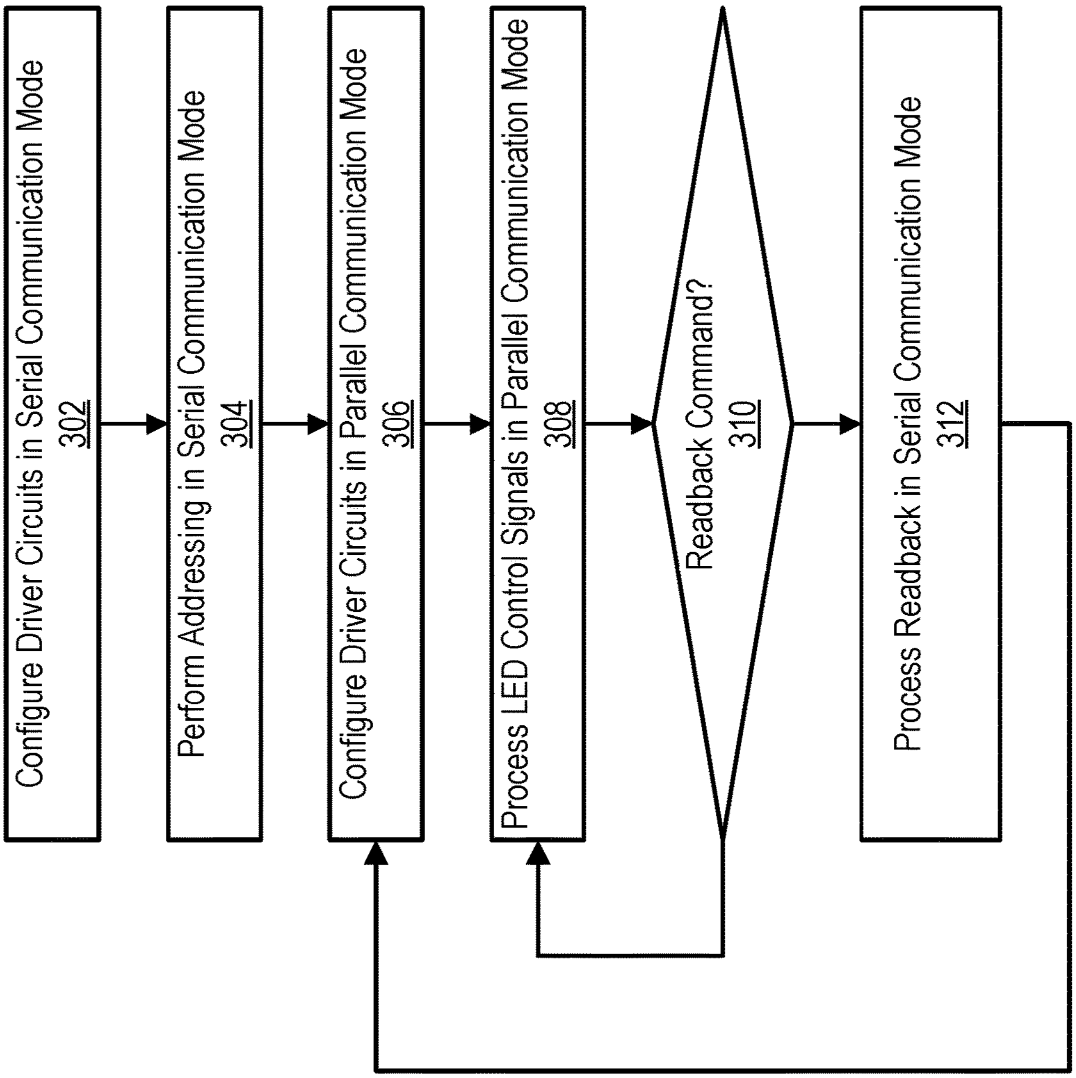
FIG. 3 is a flowchart illustrating an example embodiment of a process for operating a display device with driver circuits that are configurable between serial and parallel communication modes.

In another embodiment, the parallel path buffer 214 may be replaced with a switch 226 as shown in FIG. 2D. The switch 226 closes when operating in parallel communication mode and open when operating in serial communication mode. In this embodiment, data can be communicated in both directions when the driver circuit 120 is using the parallel communication mode. By employing a handshaking technique with the controller 110, the driver circuit 120 can receive commands in a parallel fashion, and then following the command, output data responsive to the command in a parallel fashion. Various anti-collision techniques may be utilized to prevent any loss of data due to data collisions FIG. 3 is an example embodiment of a process for operating a display device 100 with driver circuits 120 that are configurable between serial and parallel communication modes. Upon initial power-on, prior to address assignment, the driver circuits 120 are configured 302 in the serial communication mode. The control circuit 110 and the driver circuits 120 perform 304 the addressing process in the serial communication mode to facilitate assignment of addresses to the driver circuits 120. After assigning address, the driver circuits 120 are configured 306 in the parallel communication mode for normal operation. Here, the driver circuits 120 process 308 LED control signals to control LED brightness in the parallel communication mode. The driver circuits 120 detect 310 when a readback command is received (or otherwise remain in the parallel communication mode for processing 308 the LED control signals). If a readback command is received, the driver circuits 120 switch to the serial communication mode for processing 312 the readback commands. After processing the readback commands, the driver circuits 120 switch back to the parallel communication mode.

In embodiments where addresses are already stored to non-volatile memory upon initial power-on, steps 302, 304 may be skipped and the driver circuits 120 may instead initially operate in the parallel communication mode, bypassing the addressing mode.

FIG. 4A is a cross sectional view of a first embodiment of a zone IC 400 that includes an integrated LED and driver circuit 405 in a single package. In the example shown in FIG. 4A, the circuit 400 includes a printed circuit board (PCB) 410, a PCB interconnect layer 420, and the integrated LED and driver circuit 405 which comprises a substrate 430, a driver circuit layer 440, an interconnect layer 450, a conductive redistribution layer 460, and an LED layer 470. Bonded wires 455 may be included for connections between the PCB interconnect layer 420 and the integrated LED and driver circuit 405. The PCB 410 comprises a support board for mounting the integrated LED and driver circuit 405, the control circuit and various other supporting electronics. The PCB 410 may include internal electrical traces and/or vias that provide electrical connections between the electronics. A PCB interconnect layer 420 may be formed on a surface of the PCB 410. The PCB interconnect layer 420 includes pads for mounting the various electronics and traces for connecting between them.

The integrated LED and driver circuit 405 includes a substrate 430 that is mountable on a surface of the PCB interconnect layer 420. The substrate 430 may be, e.g., a silicon (Si) substrate. In other embodiments, the substrate 430 may include various materials, such as gallium arsenide (GaAs), indium phosphide (InP), gallium nitride (GaN), AlN, sapphire, silicon carbide (SiC), or the like.

A driver circuit layer 440 may be fabricated on a surface of the substrate 430 using silicon transistor processes (e.g., BCD processing) or other transistor processes. The driver circuit layer 440 may include one or more driver circuits (e.g., a single driver circuit or a group of driver circuits arranged in an array). An interconnect layer 450 may be formed on a surface of the driver circuit layer 440. The interconnect layer 450 may include one or more metal or metal alloy materials, such as Al, Ag, Au, Pt, Ti, Cu, or any combination thereof. The interconnect layer 450 may include electrical traces to electrically connect the driver circuits in the driver circuit layer 440 to wire bonds 455, which are in turn connected to the control circuit on the PCB 410. In an embodiment, each wire bond 455 provides an electrical connection to the control circuit in accordance with the connections described in any of the preceding embodiments.

In an embodiment, the interconnect layer 450 is not necessarily distinct from the driver circuit layer 440 and these layers 440, 450 may be formed in a single process in which the interconnect layer 450 represents a top surface of the driver layer 440.

The conductive redistribution layer 460 may be formed on a surface of the interconnect layer 450. The conductive redistribution layer 460 may include a metallic grid made of a conductive material, such as Cu, Ag, Au, Al, or the like. An LED layer 470 includes LEDs that are on a surface of the conductive redistribution layer 460. The LED layer 470 may include arrays of LEDs arranged into the LED zones as described above. The conductive redistribution layer 460 provides an electrical connection between the LEDs in the LED layer 470 and the one or more driver circuits in the driver circuit layer 440 for supplying the driver current and provides a mechanical connection securing the LEDs over the substrate 430 such that the LED layer 470 and the conductive redistribution layer 460 are vertically stacked over the driver circuit layer 440.

Thus, in the illustrated circuit 400, the one or more driver circuits and the LED zones including the LEDs are integrated in a single package including a substrate 430 with the LEDs in an LED layer 470 stacked over the driver circuits in the driver circuit layer 440. By stacking the LED layer 470 over the driver circuit layer 440 in this manner, the driver circuits can be distributed in the display area of a display device.

FIG. 4B is a cross sectional view of a second embodiment of a display device 480 including an integrated LED and driver circuit 485, according to one embodiment. The device 480 is substantially similar to the device 400 described in FIG. 4A but utilizes vias 432 and corresponding connected solder balls 434 to make electrical connections between the driver circuit layer 440 and the PCB 410 instead of the wires 455. Here, the vias 432 are plated vertical electrical connections that pass completely through the substrate layer 430. In one embodiment, the substrate layer 430 is a Si substrate and the through-chip vias 432 are Through Silicon Vias (TSVs). The through-chip vias 432 are etched into and through the substrate layer 430 during fabrication and may be filled with a metal, such as tungsten (W), copper (C), or other conductive material. The solder balls 434 comprise a conductive material that provide an electrical and mechanical connection to the plating of the vias 432 and electrical traces on the PCB interconnect layer 420. In one embodiment, each via 432 provides an electrical connection for providing signals such as the driver control signal from the control circuit on the PCB 410 to a group of driver circuits on the driver circuit layer 440. The vias 432 may also provide connections for the incoming and outgoing addressing signals, the supply voltage (e.g., VLED) to the LEDs in a LED zone on the LED layer 470, and a path to a circuit ground (GND).

FIG. 4C is a cross sectional view of a third embodiment of a display device 490 including an integrated LED and driver circuit 495. The device 490 is substantially similar to the device 480 described in FIG. 4B but includes the driver circuit layer 440 and interconnect layer 450 on the opposite side of the substrate 430 from the conductive redistribution layer 460 and the LED layer 470. In this embodiment, the interconnect layer 450 and the driver circuit layer 440 are electrically connected to the PCB 410 via a lower conductive redistribution layer 465 and solder balls 434. The lower conductive redistribution layer 465 and solder balls 434 provide mechanical and electrical connections (e.g., for the driver control signals) between the driver circuit layer 440 and the PCB interconnect layer 420. The driver circuit layer 440 and interconnect layer 450 are electrically connected to the conductive redistribution layer 460 and the LEDs of the LED layer 470 via one or more plated vias 432 through the substrate 430. The one or more vias 432 seen in FIG. 4C may be utilized to provide the driver currents from the driver circuits in the driver circuit layer 440 to the LEDs in the LED layer 470 and other signals as described above In alternative embodiments, the integrated driver and LED circuits 405, 485, 495 may be mounted to a different base such as a glass base instead of the PCB 410.

FIG. 5 is a top down view of a display device using an integrated LED and driver circuit 500, according to one embodiment. The circuit 500 can correspond to a top view of any of the integrated LED and driver circuits 405, 485, 495 depicted in FIGS. 4A-4C. A plurality of LEDs of an LED layer 470 is arranged in rows and columns (e.g., C1, C2, C3, . . . Cn−1, Cn). For passive matrix architectures, each row of LEDs of the LED layer 470 is connected by a conductive redistribution layer 460 to a demultiplexer which outputs a plurality of VLED signals (i.e., VLED_1 . . . VLED_M). The VLED signals provide power (i.e., a supply voltage) to a corresponding row of LEDs of the LED layer 470 via the conductive redistribution layer 460.

FIG. 6 illustrates a schematic view 600 of several layers of a display device with an integrated LED and driver circuit, according to one embodiment. The schematic view includes the PCB 410, the driver circuit layer 440, the conductive redistribution layer 460, and the LED layer 470 as described in FIGS. 4A-4C. The schematic of FIG. 6 shows circuit connections for the circuits 405, 485, 495 of FIGS. 4A-4C but does not reflect the physical layout. As described above, in the physical layout, the LED layer 470 is positioned on top of (i.e., vertically stacked over) the conductive redistribution layer 460. The conductive redistribution layer 460 is positioned on top of the driver circuit layer 440 and the driver circuit layer 440 is positioned on top of the PCB 410.

The PCB 410 includes a connection to a power source supplying power (e.g., VLED) to the LEDs, a control circuit for generating a control signal, generic I/O connections, and a ground (GND) connection. The driver circuit layer 440 includes a plurality of driver circuits (e.g., DC1, DC2, . . . DCn) and a demultiplexer DeMux. The conductive redistribution layer 460 provides electrical connections between the driver circuits and the demultiplexer DeMux in the driver circuit layer 440 to the plurality of LEDs in the LED layer 470. The LED layer 470 includes a plurality of LEDs arranged in rows and columns. In this example implementation, each column of LEDs is electrically connected via the conductive redistribution layer 460 to one driver circuit in the driver circuit layer 440. The electrical connection established between each driver circuit and its respective column of LEDs controls the supply of driver current from the driver circuit to the column. In this embodiment each diode shown in the LED layer corresponds to an LED zone. Each row of LEDs is electrically connected via the conductive redistribution layer 460 to one output (e.g., VLED_1, VLED_2, . . . VLED_M) of the demultiplexer DeMux in the driver circuit layer 440. The demultiplexer DeMux in the driver circuit layer 440 is connected to a power supply (VLED) and a control signal from the PCB 410. The control signal instructs the demultiplexer DeMux which row or rows of LEDs are to be enabled and supplied with power using the VLED lines. Thus, a particular LED in the LED layer 470 is activated when power (VLED) is supplied on its associated row and the driver current is supplied to its associated column.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

The invention claimed is:

1. A display device comprising:

an array of light emitting diode zones each comprising one or more light emitting diodes that generate light in response to respective driver currents;

a control circuit to generate driver control signals and readback command signals;

a group of driver circuits distributed in the display area of the display device, the group of driver circuits to each drive a respective light emitting diode zone by controlling the respective driver currents in response to the driver control signals, and the driver circuits to generate readback data to the control circuit responsive to the readback command signals;

a set of communication lines coupling the group of driver circuits to each other and to the control circuit in a serial chain; and wherein the group of driver circuits are switchable between a serial communication mode in which the group of driver circuits serially process communication signals received on the set of communication lines and propagate the communication signals serially through the serial chain, and a parallel communication mode in which the group of driver circuits directly propagate the communication signals between driver circuits via the set of communication lines to enable parallel processing of the communication signals.

2. The display device of claim 1, wherein in the serial communication mode, each driver circuit receives an input data signal on a data input pin, processes the input data signal through serial communication logic to generate an output data signal, and outputs the output data signal on a data output pin, and wherein in the parallel communication mode, each driver circuit receives a parallel communication signal on the data input pin, bypasses the serial communication logic, and outputs the parallel communication signal on the data output pin.

3. The display device of claim 2, wherein in the parallel communication mode, each driver circuit buffers the parallel communication signal while bypassing the serial communication logic.

4. The display device of claim 1, wherein in an addressing mode, the group of driver circuits are configured in the serial communication mode to facilitate assignment of addresses based on addressing signals serially propagated through the serial chain.

5. The display device of claim 1, wherein the group of driver circuits start up in the serial communication mode upon initial power on prior to address assignment, operate in the serial communication mode to facilitate assignment of addresses, and switch to the parallel communication mode after the assignment of addresses.

6. The display device of claim 1, wherein the group of driver circuits are configured to operate in the parallel communication mode during a normal operation mode for receiving and processing the driver control signals in parallel.

7. The display device of claim 1, wherein the group of driver circuits are configured to receive the readback command signals while operating in the parallel communication mode, and responsive to receiving the readback command signals, transition to the serial communication mode for serially communicating the readback data to the control circuit.

8. The display device of claim 1, wherein the communication lines include a readback line coupling a last driver circuit in the serial chain to the control circuit, wherein the control circuit sends the readback commands to the driver circuits in a first direction through the serial chain, and wherein the driver circuits output the readback data to the control circuit in a same direction through the readback line.

9. The display device of claim 1, wherein the group of driver circuits are configured for bidirectional communication in the serial communication mode such that the readback command is transmitted to a target driver circuit in a first direction through the serial chain, and wherein the readback data is transmitted to the control circuit in a reverse direction through the serial chain.

10. The display device of claim 1, wherein each of the light emitting diode zones and corresponding driver circuits are stacked over a substrate in an integrated package.

11. A driver circuit for a display device comprising:

mode control logic to configure a communication mode of the driver circuit between a parallel communication mode and a serial communication mode;

parallel communication control logic to receive a driver input signal and to generate an LED control signal based on the driver input signal received on a data input pin;

an LED driver to drive an LED zone in response to the LED control signal;

serial communication logic to receive the driver input signal and to output an outgoing serial communication signal; and a multiplexer to select between outputting the driver input signal to a data output pin when the driver circuit is configured in a parallel communication mode and outputting the outgoing serial communication signal to the data output pin when the driver circuit is configured in a serial communication mode.

12. The driver circuit of claim 11, wherein the mode configuration logic configures the driver circuit in the serial communication mode upon initial power on and in an addressing mode, wherein when operating in the addressing mode, the serial communication logic receives an incoming addressing signal, stores an address based on the incoming addressing signal, and outputs an outgoing addressing signal based on the incoming addressing signal to the data output pin.

13. The driver circuit of claim 11, wherein the mode configuration logic configures the driver circuit to operate in the parallel communication mode during normal operation to receive the driver input signal and to generate the LED control signal, and to pass the driver input signal to the data output pin by bypassing the serial communication logic.

14. The driver circuit of claim 11, wherein the mode configuration logic is configured to detect a readback command in the driver input signal, to configure the driver circuit in the serial communication mode responsive to the readback command, and to communicate readback data to a control circuit from the serial communication logic.

15. The driver circuit of claim 11, wherein the multiplexer comprises:

a parallel channel buffer to buffer the driver input signal to generate a buffered driver output signal provided to the data output pin when operating in the parallel communication mode; and a serial channel buffer to buffer the outgoing serial communication signal to generate the buffered driver output signal to the data output pin when operating in the serial communication mode.

16. The driver circuit of claim 11, wherein each of the LED zones and corresponding driver circuits are stacked over a substrate in an integrated package.

17. The driver circuit of claim 11, wherein the multiplexer comprises:

a switch that turns on in the parallel communication mode to couple the data input pin to the data output pin, and that turns off when operating in the serial communication mode to decouple the data input pin from the data output pin; and a serial channel buffer to buffer the outgoing serial communication signal to generate a buffered driver output signal to the data output pin when operating in the serial communication mode.

18. A method for operating a display device comprising:

generating, by a control circuit, driver control signals and readback command signals;

configuring a group of driver circuits in a serial communication mode, the group of driver circuits coupled to each other and to a control circuit in a serial chain via a set of communication lines;

facilitating assignments of addresses to the group of driver circuits in the serial communication mode using addressing signals that propagate serially through the serial chain via the set of communication lines, wherein each of the group of driver circuits serially processes the addressing signal using serial communication logic;

following the assignment of addresses, configuring the group of driver circuits in a parallel communication mode in which the serial communication logic is bypassed;

sending driver control signals to the group of driver circuits in the parallel communication mode via the communication lines to enable the group of driver circuits to process the driver control signals in parallel; and driving, by a group of driver circuits distributed in the display area of the display device, respective light emitting diode zones by controlling respective driver currents in response to the driver control signals.

19. The method of claim 18, further comprising:

transmitting, by the control circuit, a readback command to the group of driver circuits operating in the parallel communication mode;

responsive to the readback command, configuring the driver circuits in the serial communication mode; and sending readback data to the control circuit by propagating readback data through serial communication logic and the communication lines.

20. The method of claim 19, further comprising:

after sending the readback data, reconfiguring the group of driver circuits in the parallel communication mode.

21. The method of claim 19, wherein sending the readback data comprises sending the readback data in a reverse direction through the serial chain relative to a direction of the readback command.

22. The method of claim 18, wherein configuring the group of driver circuits in the parallel communication mode comprises turning on a switch to couple a data input pin to a data output pin, and wherein configuring the group of driver circuits in the serial communication mode comprises turning off the switch to decouple the data input pin from the data output pin.

* * * * *